United States Patent [19]

Stone et al.

[11] Patent Number: 5,142,670
[45] Date of Patent: Aug. 25, 1992

[54] METHOD AND APPARATUS FOR CALCULATING DISK-ACCESS FOOTPRINTS FOR USE IN SELECTING A STORAGE MANAGEMENT METHOD

[75] Inventors: Harold S. Stone, Chappaqua; Joel L. Wolf, Goldens Bridge, both of N.Y.

[73] Assignee: International Business Machines Corporation, Armonk, N.Y.

[21] Appl. No.: 224,845

[22] Filed: Jul. 26, 1988

[51] Int. Cl.⁵ ............................................. G06F 12/00
[52] U.S. Cl. ..................... 395/425; 364/248.4; 364/921.8; 364/942.7; 364/962; 364/DIG. 2; 395/600
[58] Field of Search ... 364/200 MS File, 900 MS File; 395/600, 425

[56] References Cited

U.S. PATENT DOCUMENTS

| | | | |
|---|---|---|---|
| Re. 31,407 | 10/1983 | Furtman | 364/200 |
| 3,893,084 | 7/1975 | Kotok et al. | 364/200 |
| 4,092,732 | 5/1978 | Ouchi | 364/200 |
| 4,101,969 | 7/1978 | Lawson | 364/900 |
| 4,110,830 | 8/1978 | Krygowski | 364/200 |
| 4,195,340 | 3/1980 | Joyce | 364/200 |
| 4,276,595 | 6/1981 | Brereton et al. | 364/200 |
| 4,509,118 | 4/1985 | Shenk | 364/200 |
| 4,623,988 | 11/1986 | Paulson | 364/900 |
| 4,631,699 | 12/1986 | Siwik et al. | 364/900 |
| 4,641,207 | 1/1987 | Green | 364/200 |
| 4,641,239 | 2/1987 | Takesako | 364/408 |
| 4,700,294 | 10/1987 | Haynes | 364/200 |
| 4,703,422 | 10/1987 | Kinoshita et al. | 364/200 |
| 4,796,220 | 1/1989 | Wolfe | 364/900 |
| 4,805,090 | 2/1989 | Coogan | 364/200 |

Primary Examiner—Thomas C. Lee
Assistant Examiner—Eric Coleman
Attorney, Agent, or Firm—Perman & Green

[57] ABSTRACT

A mechanism within a disk controller that computes the number of units of storage space accessed as a function of either real or virtual time. A counter is set to a reference count. Each unit of storage space has a predetermined bit set to a predetermined state indicative that the unit of storage space has not been accessed. The unit of storage space is accessed, and if the predetermined bit is in the predetermined state, the state is changed to indicate access. The counter is incremented in response to the change of state of the predetermined bit, with the count being indicative of the number of units of storage space accessed. This so-called "footprint" function can be used by the disk controller as input for an algorithm that attempts to optimize cache performance.

25 Claims, 5 Drawing Sheets 5,142,670

METHOD AND APPARATUS FOR CALCULATING DISK-ACCESS FOOTPRINTS FOR USE IN SELECTING A STORAGE MANAGEMENT METHOD

1. TECHNICAL FIELD

The invention is in the field of disk controllers, and specifically is directed to computing the number of distinct disk sectors referenced as a function of time.

2. BACKGROUND ART

Cached disk controllers must manage their caches properly to achieve optimal performance. The objective is to keep as much active data in the caches as possible to avoid the very large penalty incurred by having to access physical disk. There are a number of patents directed to disk controllers, each having certain advantages and disadvantages.

U.S. Pat. No. 4,101,969 to Lawson et al., is directed to a secondary storage facility with means for monitoring sector pulses. The problem solved by this patent is the detection of more than one respondent for a bus transaction that has a single respondent. When a disk is selected for reading data, the disk first moves a head to a selected track, then awaits the selected sector to rotate in position under the head. As the sector reaches the head, the information that passes under the read head is filtered and shaped into pulses that are reported over the bus to a host computer. A problem develops when two or more disk respond to a single command to read data. This should never occur, but could occur if a device were to fail, or if noise on the bus were to cause more than one disk to be selected. Lawson et al describes a mechanism that detects this condition by observing that two or more drives are attempting to report pulses over a bus in response to a transaction. There is no teaching relative to recording the activity of references to a disk or to a collection of disks.

U.S. Pat. No. 3,577,185 to Belady, is directed to an on-line system for measuring the efficiency of replacement algorithms in the control and measurement of a memory hierarchy. Belady measures only faults, that is, references made to a block of data that is not located in the fast memory of a hierarchy. Belady determines which faults have occurred that would have also occurred if an optimal control-algorithm were used instead of the one actually in use during the measurement period. An optimal control-algorithm requires perfect knowledge of the future, and thus cannot be implemented in principle. Belady's invention provides the information necessary to determine how close a realizable algorithm can approach the theoretical optimum. Belady records only the number of faults, and the rate at which they occur. The time at which the faults occur is not of interest, and thus is not recorded. Information is used to evaluate a replacement algorithm, and is supposedly for performance analysis only. There is no suggestions relative to measuring activity of accesses to a disk.

U.S. Pat. No. 4,542,458 to Kitajima et al., is directed to an attempt at solving the so-called File Assignment Problem. In other words, it attempts to place files onto devices (e.g., DASD) in an optimal fashion. It is assumed that the maximum allowable access rate and maximum allowable utilizations are known for each device. No methodology is given for determining these numbers. In the simplest version of the invention, files are reordered by access rate frequency, and the devices are reordered by processing speed (i.e., nominal response time estimates). Assume that the first $n-1$ files have been assigned by the algorithm to devices (including the initial case where $n=1$.) A greedy algorithm then picks, for the nth file, a 'fastest' possible device amongst those devices for which the access rate and utilization constraints would not be violated. The constraint equations are then updated, and the process continues with the $n+1$st file. Enhancements to this algorithm have additional constraints such as device failure rates, or response time priorities by type of file access.

U.S. Pat. No. 4,429,363 to Duke et el. assists in the dynamic operation of a cache. It suggests the monitoring of cache misses, write operations and certain status information relating to the last track referenced (LTR). It then uses this information to help determine when to promote DASD records to the cache, and occasionally when to demote DASD records from the cache. As a simple illustrative example, when there are no writes to any track in a series of requests, the LTR contents are promoted to cache; with a write, the LTR contents are not promoted. The inhibiting of certain cache promotions is intended to decrease the cache miss rate for reads. A series of additional cache promotion/demotion decisions are made for similar purposes.

According to the present invention, a disk controller computes the number of distinct sectors referenced as a function of time. The computation is used by cache management algorithms for optimization of disk cache.

DISCLOSURE OF THE INVENTION

A mechanism within a disk controller computes the number of distinct sectors referenced as a function of either real or virtual time. This is termed as "footprint" function which is used by the disk controller as input for an algorithm that attempts to optimize cache performance.

BEST MODE OF CARRYING OUT THE INVENTION

The invention consists of a mechanism that computes the footprint function by recording access to disk sectors. A disk sector for the purpose of this invention is a basic unit of information access in a disk system. Each Write or Read of the disk system specifies a sector in the disk storage space. For Write operations the information to fill a sector flows to the disk storage area, and for Read operations, the information stored in a sector flows from the disk region. In some disk storage systems, larger regions called cylinders and tracks, each composed of many sectors, can be Read or Written by individual operations. For purposes of description of this invention, no distinction is made between sectors, clusters, cylinders, and tracks, or any other unit of disk storage space. The footprint function can be defined in terms of any single measure of storage, and the calculation of the footprint can be generalized directly to systems that support intermixed access to different units of storage area simply by treating an access to a composite area as a sequential set of accesses to the smaller area contained within the composite area.

The footprint function produced by the invention is a sequence of pairs of numbers of the form ($time_i$, $size_i$), which specifies the footprint function as a function of time. The size of a footprint is the number of distinct sectors visited since $time_o$.

To be of maximum benefit for storage management, it may be necessary to determine the footprint function for accesses to individual data sets or for access produced by particular processes, quite apart from the footprint function that describes the behavior of the composite of all accesses to the entire storage system. Therefore the invention provides a means for filtering access requests, so as to select specific ones from the reference stream for processing. Unselected references do not participate in footprint computation.

Although the footprint function is defined as a function of time, it can equally be treated as a function of the total number of accesses to disk. If disk accesses occur at a uniform rate, then the two forms of measuring footprints produce results that differ only by a scale factor. When time is used as a basis, the invention requires a real-time clock for supplying the X-axis information. When access count is used as a basis, the invention requires an accumulator to count the accumulated accesses. In what follows, it is assumed that the footprint function is produced as a function of time, but note that time, total count, or both are equally easy to produce.

Figure 1:
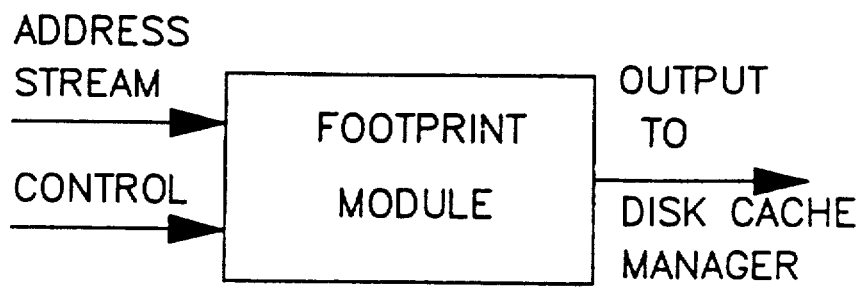
FIG. 1 is a block diagram of a footprint module.

An overview of the invention appears in FIG. 1. This figure shows that the device that calculates the footprint receives a stream of addresses as one of its inputs and produces the footprint of the address stream at its output. The figure shows the output used by a device that manages a disk cache. This is one possible use for the footprint data. The figure also shows an input of control information. The control information is necessary to reset the module when it is first started, and optionally may include other control functions that govern the behavior of the module as it gathers footprint data.

Figure 2:
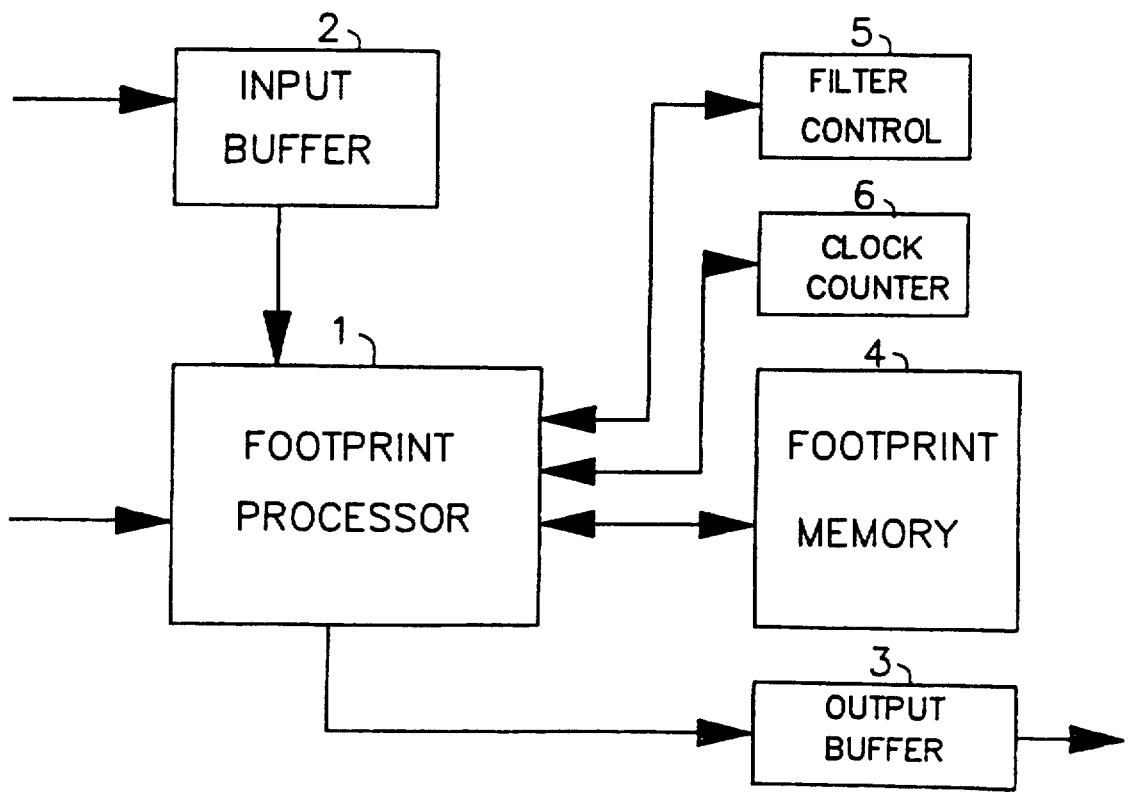
FIG. 2 is a block diagram of a system for calculating disk-access footprints.

FIG. 2 shows the internal structure of the footprint module. This figure describes the module as it would be constructed using conventional microprocessor technology, but any implementation that has a control unit, memory, and arithmetic unit of a conventional form may be utilized, and is not further elaborated here. Logic blocks 2 and 3, respectively, are the input and output buffers of a footprint processor 1 through which data are exchanged with the external modules in the disk system. The address stream passes through the input buffer 2, and the footprint function calculations are passed to the output buffer 3 for reporting to other modules.

Logic block 4 is a memory dedicated to the recording of the footprint function. It can be implemented as a conventional random-access computer memory. The footprint memory 4 need not be a distinct memory from the memory contained within the footprint processor 1, provided that sufficient space is dedicated within the processor memory system to hold the information required to record the footprint information contained within an address stream.

Logic block 5 is a filter control unit which uses information to control the filtering of addresses. The footprint processor 1 is capable of examining subsets of addresses, and of computing footprints for subsets of addresses, as well as a footprint for the entire address stream. The purpose for this computation is to be able to give a separate characterization of the behavior of each major component of an address stream. Logic block 5 records the information that is used by the footprint processor 1 to filter the address stream. It can be a conventional computer memory, or can be incorporated within the memory system of the footprint processor 1.

Logic block 6 includes a memory, and holds the clock counter associated with an address stream. Footprints are calculated as a function of virtual time. The time base is recorded in logic block 6. Time can be maintained in any of several ways:
1. Real time, in which case the clock counter is incremented for each tick of a real-time clock within the logic block,
2. Address-stream reference count, in which case the counter is increased for each address in the full address stream, and
3. Filtered address-stream reference count, in which case the counter is increased for each address in the subset of addresses produced by a filtering operation on the full stream of address.

The clock counter logic block 6 has a counter dedicated to each footprint function that is being calculated. The module is capable of recording a multiplicity of footprint functions concurrently, one for each address-stream filter that is currently active. The logic block can be implemented as a conventional memory. To increase a counter value, the clock is retrieved by the footprint processor 1, incremented, and restored in the counter memory. Alternately, logic block 6 can be implemented as a collection of counters in which the counter logic is embedded in the logic block. The footprint processor 1 for such an implementation should have the capability of resetting a counter, incrementing it, loading an arbitrary value into the counter, and reading the contents of the counter.

Figure 3:
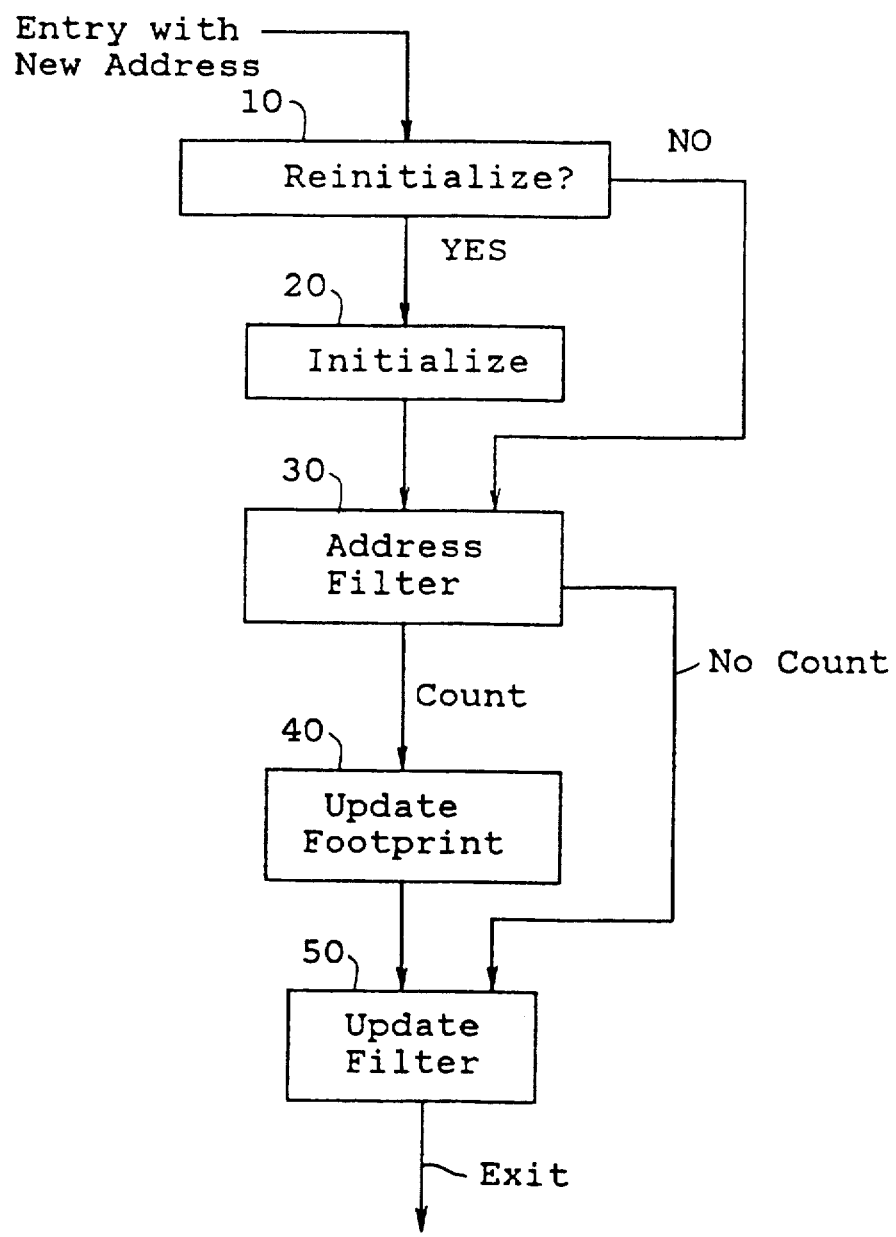
FIG. 3 is a general flow chart of the invention.

The basic operation of the footprint module is set forth in FIG. 3 which shows the internal flow of control at the highest level. This figure shows that as each access reaches the footprint calculation device, the device in logic block 10 determines if the footprint calculation should be initialized at this time. In logic block 20, the footprint function is initialized if the outcome of logic block 10 is a response that forces the initialization to occur. If logic block 20 is not required, it is skipped. The next operation in either case is an address-filtering operation described by logic block 30. Each request is analyzed to determine if the request participates in the computation of a footprint for some specific process, or if the request can be ignored. If the request participates, it is used to update the footprint in logic block 40.

Logic block 50 analyzes the history of accesses to determine if the address filter should be altered. In this block the invention determines if more processes need to be analyzed, either because they are new to the system or because their behavior has not been recently sampled, or for any other reason relating to the characteristic behavior of the process that requires a new sampling of the footprint function. One such reason is that the process behavior may have changed in recent accesses from what has been the observed past behavior. If the footprint function has to be gathered for a new process, the address filter is changed.

Another possible change of address filter may be due to the removal of a process from footprint analysis. This can occur at a fixed time from the beginning of an analysis, after a fixed number of accesses have been observed, or after some other similar condition has become true.

FIGS. 4 through 9 show expanded detail of the operation of logic blocks 10, 20, 30, 40 and 50 of FIG. 3.

Figure 4:
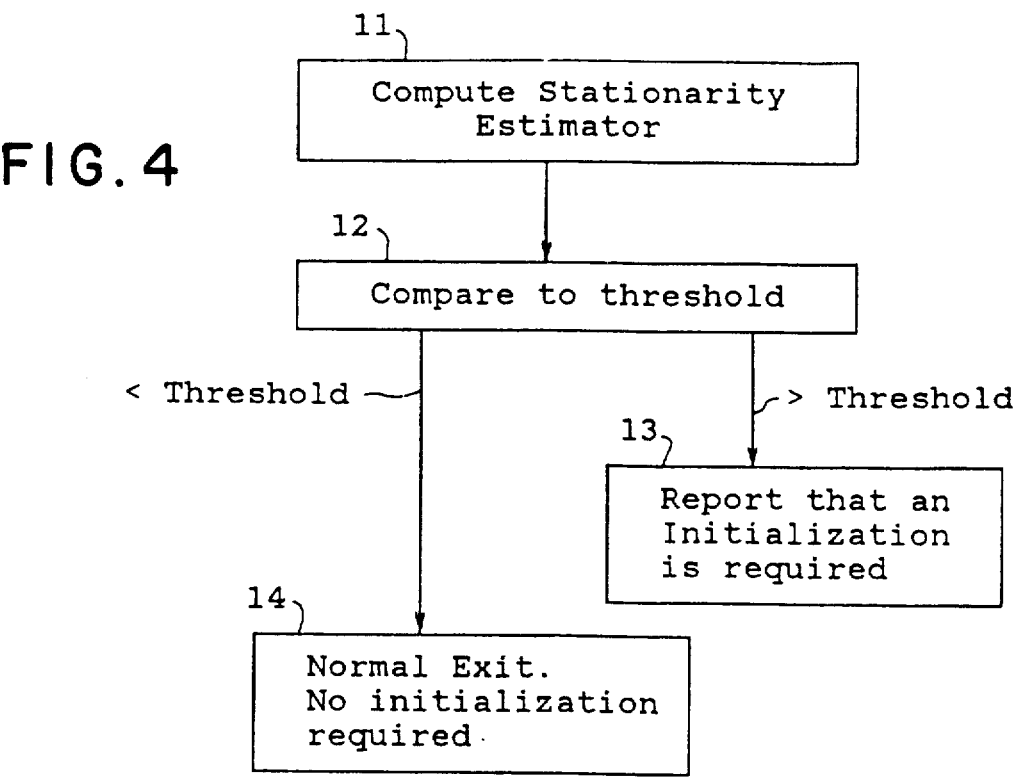
FIG. 4 is a flow chart indicative of the determination of when to initialize.

In FIG. 4 the function of logic block 10 of FIG. 3 is detailed. The determination of when to initialize a footprint computation is made by blocks 11, 12, 13 and 14. The purpose of the logic blocks shown in FIG. 4 is to determine if the current characteristics differ sufficiently from the long-term average characteristics to warrant reinitialization of footprint gathering. For example, the long-term average may indicate that a reference stream contains between 10 and 20 distinct process identifiers in 1-minute intervals of time. The current history indicates that there are 30 distinct process identifiers in the most recent 1-minute intervals. This suggests that the characteristics of the disk accesses have changed recently, and a new footprint should be obtained to describe the current behavior of the system.

Logic block 11 in FIG. 4 calculates the value of one or more characteristics of the stream of disk access requests. For the example given here, block 11 calculates the number of distinct process identifiers per 1-minute interval, and produces both a short-term running average and a long-term running average, and the difference in the two. The difference in the two is an estimate of the stationarity of the disk accesses characteristics. If current accesses are essentially similar to the long-term average, then the access requests are stationary over time, and the value of the stationarity estimator is small. If current accesses differ substantially from the long-term average, then the access stream has become nonstationary, and the stationarity estimator indicates this with a large value. Logic block 12 compares the value of the stationarity estimator with a threshold. If the value of the estimator is larger than the threshold, then logic block 13 produces an indication that an initialization is required, and exits to logic block 20 of FIG. 3. If the value of the estimator is smaller than the threshold, then logic block 14 produces a normal exit indication, and exits to logic block 30 of FIG. 3.

Figure 5:
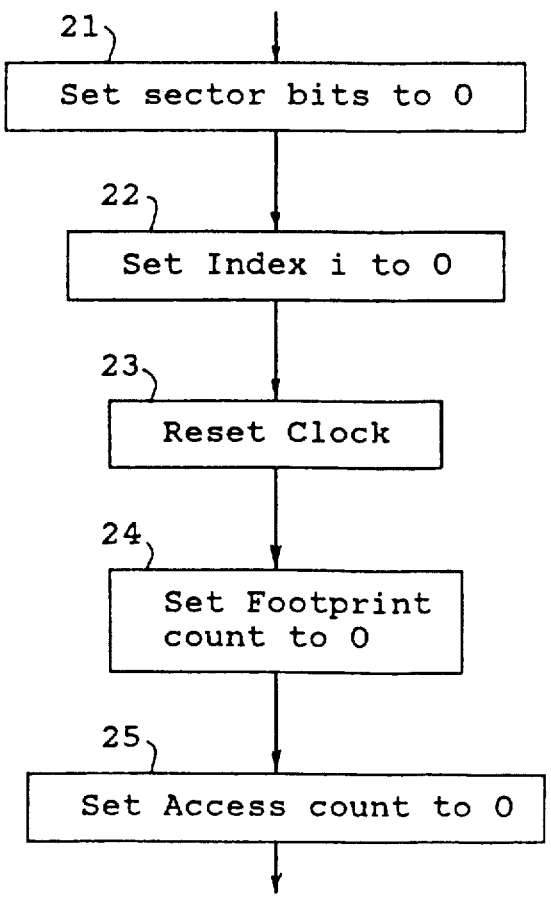
FIG. 5 is a flow chart of the initialization function.

FIG. 5 shows the initialization process, expanding logic block 20 if FIG. 3. Logic block 21 receives the report that initialization is required from logic block 13 of FIG. 4. In response to the report, logic block 21 sets all sector bits to 0. This indicates that the corresponding sectors have not been accessed. Logic block 22 sets and index i to 0. This index is used to count the total number of accesses within a footprint. As the index changes for i to i+1, the footprint time changes $time_i$ to $time_{i+1}$ and associated with the value $time_i$, the footprint mechanism captures the value of $size_i$, the number of distinct sectors in the footprint accessed up to time $time_i$.

Logic block 23 resets a clock so that footprints can be measured with a real-time or virtual-time base, as well as by total number of accesses. Logic block 24 initializes the footprint count to 0. The footprint count is the number of unique sectors accessed since initialization.

Footprint functions need not be measured as a function time. It is also meaningful to measure them as a function of the number of accesses. If this is the case, the access count must be maintained by the footprint mechanism. The access count is initialized to zero in logic block 25.

Figure 6:
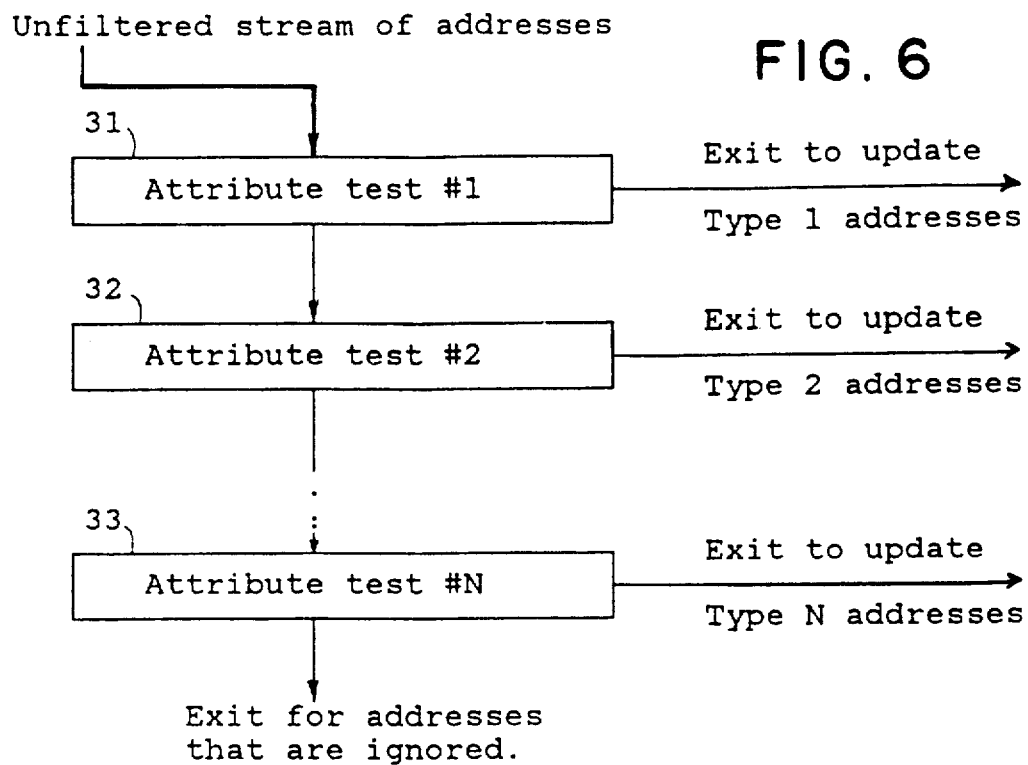
FIG. 6 is a flow chart of the filtering of an address stream.

The address filtering mechanism in logic block 30 of FIG. 3 is shown in FIG. 6. Each of the blocks in this figure are similar. A typical block, say logic block 31, examines the next access request in an address stream. If the request satisfies a number of tests that characterizes a particular footprint measurement, then an exit is taken to the logic block that uses this request to update the footprint calculation.

As an example of a filter, it may be desirable to calculate the footprint of all disk accesses produced by a particular user, so the filter examines the user ID associated with access request. It may also be desirable to calculate the footprint of accesses to a particular file or database. In this case, the filter associates each disk access with some larger data object, and extracts the accesses to a particular data object.

FIG. 6 shows a situation in which each access participates in at most one filter. If a request is removed by Filter 1 (attribute test #1), for example, the figure does not show a path by which that request can be routed to Filter 2 (attribute test #2). It is not essential for the purposes of the invention that each attribute test be disjoint. It is permissible for an access to satisfy a plurality of attribute tests and for an access to be a component of all of the footprint updates whose filter tests are satisfied by the access. If this is the case, then in FIG. 6, when an access satisfies a specific filter test, say logic block 31, it used to update the corresponding footprint, and then is returned to the next logic block, logic block 32 in this case, for additional testing and processing.

Figure 7:
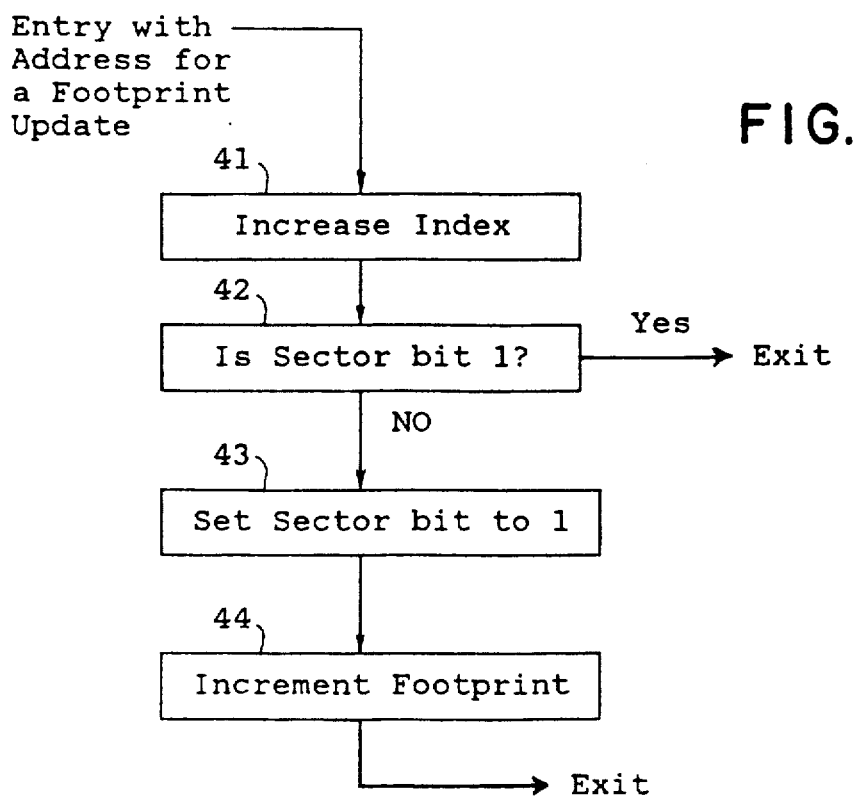
FIG. 7 is a flow chart of the function of updating the footprint on filtered sector access.

The processing of an access for a specific footprint is illustrated in FIG. 7. If the footprint data is gathered as a function of access count, the access count is updated in block 41. If the footprint data is gathered as a function of time, the appropriate means for this update appears below in the discussion of FIG. 8, and logic block 41 of FIG. 7 is unnecessary.

Continuing the explanation of FIG. 7, it is noted that logic block 42 tests the sector bit of the accessed sector to determine if this is a new access. If not, the process is exited. If so, the sector bit is set to 1 to indicate that a subsequent access is not new. This occurs in logic block 43. The footprint counter is incremented in block 44 to show that the total size of the footprint has increased.

The processing shown in FIG. 7 is performed for each filter described by FIG. 6. If a sector access satisfies more than one access filter, the sector should have distinct sector bits associated with each filter, and the sector bits should be initialized separately. All sector bits associated with a specific filter are initialized concurrently, and different filters can be initialized at different times.

Figure 8:
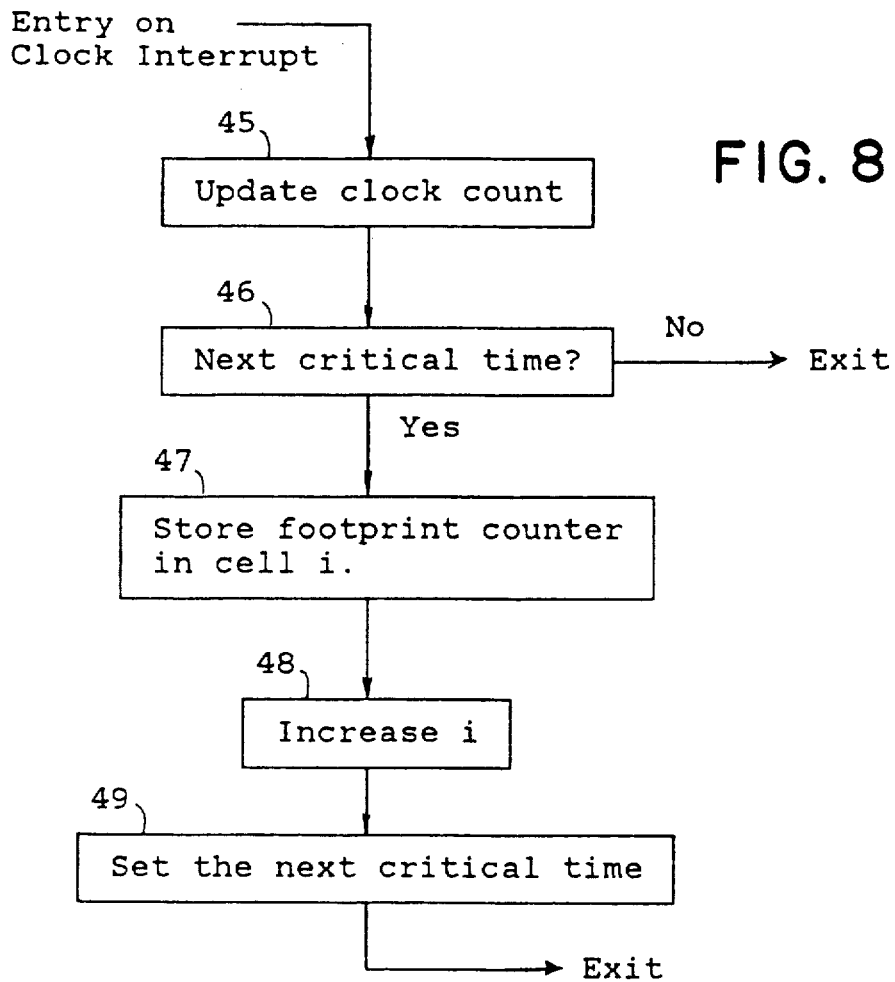
FIG. 8 is a flow chart of the function of updating a footprint on time tick.

FIG. 8 shows how to capture footprints as a function of time. The figure shows the processing steps that occur periodically, for example, as forced by the occurrence of a periodic interrupt. Logic block 45 increments the clock count, which shows the elapsed time since initialization or since the last critical time was passed. Logic block 46 tests the counter to determine if the next critical time has been reached. The purpose of this block is to sample the footprint function at discrete points in time rather than to produce the full detail of the footprint function. The intent is to reduce the amount of data that has to be saved, but the data reduction also tends to smooth out statistical fluctuations in the data by averaging the function over a selectable interval of time.

If the current value of the clock count is not a critical time, logic block 46 forces an exit. If the clock count is a critical time, then logic block 47 stores the current value of the footprint counter as the value of size$_i$. Logic block 49 calculates the value of the next critical time at which the footprint function is captured.

If the footprint function is captured as a function of the access number instead of as a function of time then FIG. 8 can be modified in a straightforward way for this purpose. Logic block 46 tests an access count to determine if it is the next critical access count, and Logic block 49 sets the value of the next critical access count. The process depicted in logic blocks 46,47,48 and 49 in this case are completed immediately after the processing of logic block 41 of FIG. 7, where it is triggered by the presence of an access instead of by the presence of a clock interrupt.

The footprint mechanism described thus far has the ability to measure the footprints for a plurality of access processes as determined by corresponding filters on the access stream. Moreover, for each filter, the mechanism has the ability to measure stationarity, and reinitialize the footprint function if a filtered access stream shows a change in behavior.

Figure 9:
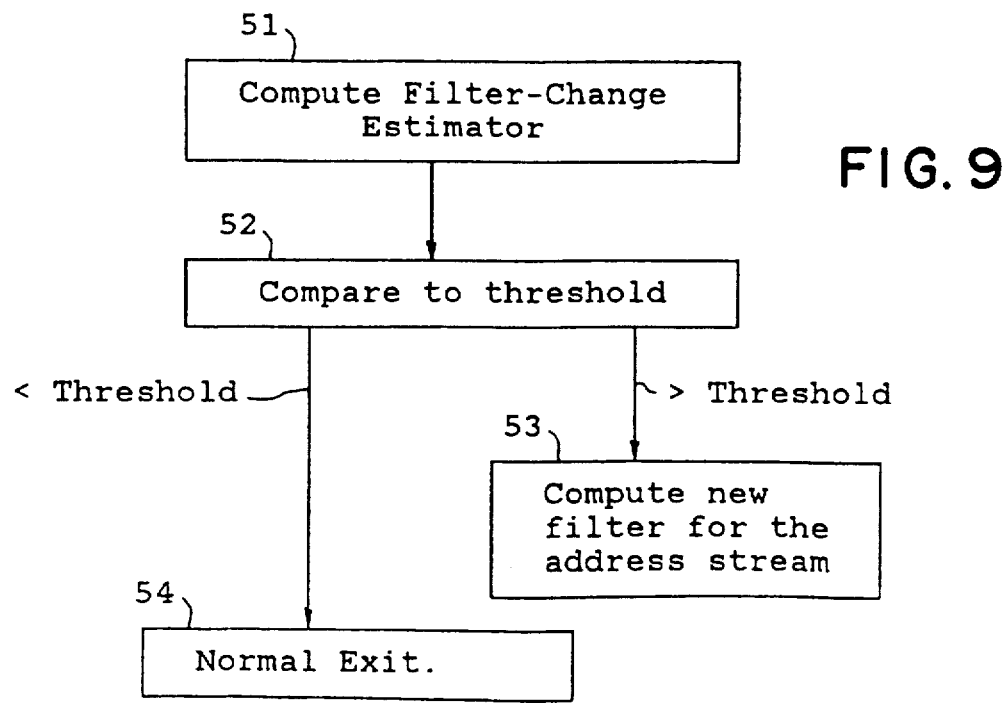
FIG. 9 is a flow chart of the function of determining when to change address filters.

The footprint mechanism also has the ability to add or remove filters from the measuring process as shown in FIG. 9. Over long periods of time it may be necessary to remove filters if the corresponding address stream becomes inactive, or shows stability over very long times. Logic block 51 calculates an estimate that is used to determine if a filter continues to be needed. Logic block 52 compares this estimate to a threshold, and logic block 53 alters or removes the filter if the estimator is above the threshold. If not, logic block 54 produces a normal exit.

FIG. 9 also shows the structure of how to add new filters. Logic block 51 can analyze access requests to determine if any subset should be tracked by a filter.

For any interesting subset of access requests, the estimator produced by logic block 51 is compared to a threshold. If the estimator exceeds the threshold, logic block 53 adds the filter. If the estimator is less than the threshold a normal exit is made at 54.

As examples of the use of the mechanism depicted in FIG. 9, it may be interesting to measure the footprint of accesses to a specific file or data object in memory. Logic block 51 can observe the occurrence of accesses to objects that are newly referenced. When the rate of accesses reaches a sufficient threshold or when the total number of accesses reaches a sufficient threshold, the address filter for that object can be installed in the footprint mechanism.

To demonstrate one of many possible uses, consider a disk system that is used for two distinct workloads at various times of day. One of these might, for example, be a query workload, and the other a largely sequential workload. The characteristics of the query workload is that accesses tend to be clustered to heavily used directories and indices with a small percentage of accesses scattered randomly over auxiliary storage. The sequential workload tends to select entire files at random, and to process each file sequentially.

Optimum management of disk-cache is different for the two workloads. The purpose of the invention is to produce data that can be used to determine which workload is currently running, and also to indicate periods when the current workload is a mixture of the two as the system load changes from one to the other.

The footprint function can be calculated at periodic intervals, and interrogated by the cache manager. If the footprint function is rapidly increasing, the current workload is assumed to be the sequential workload, which tends to look at each sector only once. If the footprint function is slowly increasing, the current workload is assumed to be the query workload, which tends to access certain directories and indices repeatedly. The value of the footprint function can be used to determine which disk-cache management policy to invoke at a given time.

INDUSTRIAL APPLICABILITY

It is an object of the invention to provide an improved disk controller.

It is another object of the invention to provide an improved method of computing the number of sectors referenced on a disk as a function of time.

It is yet another object of the invention to provide an improved method of measuring the footprint function for a sequence of disk accesses.

It is still another object of the invention to provide an improved method of filtering disk accesses to select a plurality of subsets, and to compute a separate footprint function for each subset.

It is a further object of the invention to provide an improved method of reinitializing the footprint function to recompute as necessary when the disk accesses show current behavior that is different from long-term behavior.

It is yet a further object of the invention to provide an improved method of changing access filters as necessary when new processes require footprint measurements and when old processes no longer need footprint measurements.

It is still yet a further object of the invention to measure the footprint function as a function of time.

It is still a further object of the invention to measure the footprint function as a function of the access count.

Having thus described our invention, what we claim as new, and desire to secure by Letters Patent is:

1. A method of computing the number of units of storage space accessed in a storage medium, said method comprising the steps of:
    setting a predetermined bit in each unit of storage space to a predetermined state indicative that said unit of storage space has not been accessed;
    setting a counter to a reference count;
    accessing a unit of storage space, and if said predetermined bit is in said predetermined state, changing the state to indicate the unit of storage space has been accessed;
    incrementing said counter in response to the change of state of said predetermined bit as a result of the unit of storage space being accessed, with the count of said counter being indicative of the number of units of storage space accessed; and
    determining which one of a plurality of storage management methods to utilize based on predetermined types of accesses to the storage medium and the count of said counter.

2. The combination claimed in claim 1, wherein said predetermined types of accesses to said storage medium comprise a particular file or data base.

3. The combination claim in claim 1, wherein said predetermined types of accesses to said storage medium comprise accesses by a particular user.

4. The combination claimed in claim 1, wherein said predetermined type of accesses to said storage medium comprise addresses to a subset of the address stream for said storage medium.

5. The combination claimed in claim 1, wherein said predetermined type of accesses to said storage medium comprise access based on a distinct type of workload.

6. The combination claimed in claim 5, wherein said distinct type of workload is a query workload.

7. The combination claimed in claim 5, wherein said distinct type of workload is a sequential workload.

8. A method of computing the number of units of disk storage space accessed, said method comprising the steps of:
setting a predetermined bit in each unit of disk storage space to a predetermined state indicative that said unit of disk storage space has not been accessed;
setting a counter to a reference count;
examining the state of the predetermined bit in a unit of disk storage space when accessing that unit, and if in said predetermined state, changing the state to indicate the unit has been accessed; and
incrementing said counter in response to the change of state of said predetermined bit as a result of the unit being accessed, with the count of said counter being indicative of the number of units of storage space accessed;
the method further including the step of:
examining the count of said counter to determine which one of a plurality of storage management methods to utilize based on predetermined types of accesses to the storage medium.

9. The method of claim 8, wherein said unit of disk storage comprises a sector.

10. The method of claim 8, wherein said unit of disk storage comprises a track.

11. The method of claim 8, wherein said unit of disk storage comprises a cluster.

12. The method of claim 8, wherein said unit of disk storage comprises a cylinder.

13. A method of computing the number of units of disk storage space accessed in a predetermined time interval, said method comprising the steps of:
counting pulses indicative of units of time by a clock counter for providing a time count indicative of said predetermined time interval;
setting at least one bit in each unit of disk storage space to a predetermined state indicative that said unit of disk storage has not been accessed;
setting an access counter to a preference count;
accessing a unit of disk storage space, and if said at least one bit is in said predetermined state, changing the state to indicate the unit has been accessed;
incrementing said access counter in response to the change of state of said at least one bit as a result of said unit being accessed, with the count of said access counter being indicative of the number of units of disk storage space accessed; and
determining the count of said access counter when said clock counter reaches said time count indicative of said predetermined time interval to determine the number of units of disk storage space accessed during said predetermined time interval.

14. The method of claim 13, including the step of:
determining which one of at least two storage management methods to utilize at a given time, based on predetermined types of accesses to said disk storage space during said predetermined time interval.

15. The method of claim 14, wherein said unit of disk storage comprises a sector.

16. The method of claim 14, wherein said unit of disk storage comprises a track.

17. The method of claim 14, wherein said unit of disk storage comprises a cluster.

18. The method of claim 14, wherein said unit of disk storage comprises a cylinder.

19. A method of computing the number of units of disk storage space accesses of a predetermined type, said method comprising the steps of:
examining storage access requests in an address stream to determine access requests of said predetermined type;
setting a predetermined bit in each unit of disk storage space to a predetermined data indicative that said unit of disk storage space has not been accessed;
setting a counter to a reference count;
accessing a unit of disk storage space in response to an access request of said given type, and if said predetermined bit is in said predetermined state, changing the state to indicate the unit has been accessed;
incrementing said counter in response to the change of state of said predetermined bit as a result of the unit being accessed by an access request of said predetermined type, with the count of said counter being indicative of the number of units of storage space accessed; and
invoking a given storage management method in response to said counter being incremented to a selected count.

20. A method of computing the number of units of disk storage space accesses of a predetermined type in a predetermined time interval, said method comprising the steps of:
examining storage access requests in an address stream to determine access requests of said predetermined type;
counting pulses indicative of units of time by a clock counter for providing a time count indicative of said predetermined time interval;
setting at least one bit in each unit of disk storage space to a predetermined state indicative that said unit of disk storage has not been accessed;
setting an access counter to a reference count;
accessing a unit of disk storage space in response to an access request of said predetermined type, and if said at least one bit is in said predetermined state, changing the state to indicate the unit has been accessed;
incrementing said access counter in response to the change of state of said at least one bit as a result of said unit being accessed with the count of said access counter being indicative of the number of units of disk storage space accessed;
determining the count of said access counter when said clock counter reaches said time count indicative of said predetermined time interval to determine the number of units of disk storage space accesses of said predetermined type during said predetermined time interval; and invoking a given storage management method in response to said access counter reaching a selected count during said predetermined time interval.

21. A method of computing the number of units of disk storage space accesses of at least two different predetermined types in a predetermined time interval, said method comprising the steps of:

examining storage access requests in an address stream to determine access requests of said at least two different predetermined types;

counting pulses indicative of units of time by a clock counter for providing a time count indicative of said predetermined time interval;

setting at least one bit in each unit of disk storage space to a predetermined state indicative that said unit of disk storage has not been accessed;

setting an access counter to a reference count;

accessing a unit of storage space in response to an access request of one of said at least two different types, and if said at least one bit is in said predetermined state, changing the state to indicate the unit of storage space has been accessed;

incrementing said access counter in response to the change of state of said at least one bit as a result of the unit of storage space being accessed, with the count of said access counter being indicative of the number of units of disk storage accessed;

determining the count of said access counter when said clock counter reaches said time count indicative of said predetermined time interval to determine the number of units of disk storage space accesses of said at least two different predetermined types during said predetermined time interval;

invoking a first storage management method in response to said access counter reaching a first count during said predetermined time interval; and invoking a second storage management method in response to said access counter reaching a second count during said predetermined time interval.

22. The method of claim 21, wherein the first type of access request of said at least two different predetermined types is based on the user ID associated with the access request, and the second type of access request of said at least two different predetermined types is based on the particular file or database associated with the access request.

23. The method of claim 21, including the step of:
changing at least one of the at least two different types of predetermined access request parameters.

24. Apparatus for computing the number of units of disk storage space accesses of a predetermined type, comprising:

a disk storage device;

means for examining storage access requests in an address stream to determine access requests of said predetermined type;

means for setting a predetermined bit in each unit of disk storage space of said disk storage device to a predetermined state indicative that said unit of disk storage space has not been accessed;

a counter which is set to a reference count;

means for accessing a unit of disk storage space in response to an access request of said given type, and if said predetermined bit is in said predetermined state, including means for changing the state to indicate the unit has been accessed;

means for incrementing said counter in response to the change of state of said predetermined bit as a result of the unit being accessed by an access request of said predetermined type, with the count of said counter being indicative of the number of units of storage space accessed; and means for invoking a given storage management method in response to said counter being incremented to a selected count.

25. Apparatus for computing the number of units of disk storage space accesses of a predetermined type in a predetermined time interval, comprising:

a disk storage device;

means for examining storage access requests in an address stream to determine access requests of said predetermined type;

counting pulses indicative of units of time by a clock counter for providing a time count indicative of said predetermined time interval;

means for setting at least one bit in each unit of disk storage space to a predetermined state indicative that said unit of disk storage of said disk storage device has not been accessed;

means for setting an access counter to a reference count;

means for accessing a unit of disk storage space in response to an access request of said predetermined type, and if said at least one bit is in said predetermined state, changing the state to indicate the unit has been accessed;

means for incrementing said access counter in response to the change of state of said at least one bit as a result of said unit being accessed, with the count of said access counter being indicative of the number of units of disk storage space accessed;

means for determining the count of said access counter when said clock counter reaches said time count indicative o said predetermined time interval to determine the number of units of disk storage space accesses of said predetermined type during said predetermined time interval; and means for invoking a given storage management method in response to said access counter reaching a selected count during said predetermined time interval.

* * * * *

UNITED STATES PATENT AND TRADEMARK OFFICE
CERTIFICATE OF CORRECTION

PATENT NO. : 5,142,670
DATED : August 25, 1992
INVENTOR(S) : STONE ET AL

It is certified that error appears in the above-identified patent and that said Letters Patent is hereby corrected as shown below:

```
Claim 3, col. 9, line 4, the instance of the first word "claim"
     should be "claimed";
Claim 13, col. 9, line 57, the word "preference"
     should be "reference;
Claim 19, col. 10, line 24, the word "data"
     should be "stated";
Claim 25, col. 12, line 51, the word "o" should be "of".
```

Signed and Sealed this

Fifth Day of October, 1993

Attest:

BRUCE LEHMAN

*Attesting Officer*  *Commissioner of Patents and Trademarks*